US012300956B2

(12) United States Patent
Solanki et al.

(10) Patent No.: US 12,300,956 B2
(45) Date of Patent: May 13, 2025

(54) ELECTRICAL CONNECTOR ASSEMBLY MACHINE

(71) Applicant: TE Connectivity Services GmbH, Schaffhausen (CH)

(72) Inventors: Swapnilsinh Solanki, Harrisburg, PA (US); Scott Thomas Schlegel, Middletown, PA (US); Jiankun Zhou, Mechanicsburg, PA (US); Roberto Francisco-Yi Lu, Bellevue, WA (US)

(73) Assignee: TE Connectivity Solutions GmbH (CH)

(*) Notice: Subject to any disclaimer, the term of this patent is extended or adjusted under 35 U.S.C. 154(b) by 927 days.

(21) Appl. No.: 17/230,068

(22) Filed: Apr. 14, 2021

(65) Prior Publication Data

US 2022/0337013 A1 Oct. 20, 2022

(51) Int. Cl.
*H01R 43/20* (2006.01)
*H01R 13/04* (2006.01)

(52) U.S. Cl.
CPC ............. *H01R 43/20* (2013.01); *H01R 13/04* (2013.01)

(58) Field of Classification Search
CPC ................................ H01R 13/04; H01R 43/20
See application file for complete search history.

(56) References Cited

U.S. PATENT DOCUMENTS 6,463,653 B1 * 10/2002 Gamel ................. H05K 13/022 29/840
6,948,235 B1 9/2005 Rubenstein et al.
2022/0337013 A1 * 10/2022 Solanki .................. H01R 43/20

FOREIGN PATENT DOCUMENTS

DE 102014209878 A1 11/2015

OTHER PUBLICATIONS

International Search Report, International App. No. PCT/IB2022/053544 International Filing Date Apr. 14, 2022.

* cited by examiner

*Primary Examiner* — Minh N Trinh

(57) ABSTRACT

An electrical connector assembly machine includes a pin support mechanism having first and second pin support forks. The first pin support fork includes a first connecting bar and first tines defining first gaps configured to receive connecting pins of contacts. The second pin support fork includes a second connecting bar and second tines defining second gaps configured to receive the connecting pins of the contacts. The first pin support fork is shifted in a first lateral direction to load the first tines against the connecting pins and the second pin support fork is shifted in a second lateral direction opposite the first lateral direction to load the second tines against the connecting pins. The first tines and the second tines cooperate to hold the connecting pins relative to each other for loading a pin organizer of the electrical connector onto ends of the connecting pins.

18 Claims, 5 Drawing Sheets

ELECTRICAL CONNECTOR ASSEMBLY MACHINE

BACKGROUND OF THE INVENTION

The subject matter herein relates generally to assembly machines for electrical connectors.

Large electrical connectors typically have many contacts, such as in excess of one-hundred contacts. Some electrical connectors are configured to be mounted to a circuit board. The pins at the ends of the contacts need to be precisely positioned for termination to the circuit board. For example, the pins need to be aligned with vias in the circuit board. Misalignment of any of the pins may lead to damage to the pins during assembly, such as bending or breaking of the pin. Some known electrical connectors use a pin organizer to provide stability and alignment to the pins. However, installation of the pin organizer may be complicated, particularly for large electrical connectors having many contact pins. Long pins are particularly susceptible to misalignment and damage during installation of the pin organizer.

A need remains for an assembly machine for assembling pin organizers on pins of electrical connectors.

BRIEF DESCRIPTION OF THE INVENTION

In one embodiment, an electrical connector assembly machine for assembling an electrical connector having contacts held by a connector housing is provided. The electrical connector assembly machine includes a frame including a connector pocket configured to receive the electrical connector. The frame includes a locating feature for locating the electrical connector relative to the frame. The electrical connector assembly machine includes a pin support mechanism coupled to the frame. The pin support mechanism includes a first pin support fork and a second pin support fork. The first pin support fork includes a first connecting bar and a plurality of first tines extending from the first connecting bar. The first tines define first gaps between the first tines configured to receive connecting pins of the contacts. The second pin support fork includes a second connecting bar and a plurality of second tines extending from the second connecting bar. The second tines define second gaps between the second tines configured to receive the connecting pins of the contacts. The first pin support fork is shifted in a first lateral direction to load the first tines against the connecting pins and the second pin support fork is shifted in a second lateral direction opposite the first lateral direction to load the second tines against the connecting pins. The first tines and the second tines cooperate to hold the connecting pins relative to each other for loading a pin organizer of the electrical connector onto ends of the connecting pins.

In another embodiment, an electrical connector assembly machine for assembling an electrical connector having contacts held by a connector housing is provided. The electrical connector assembly machine includes a frame including a connector pocket configured to receive the electrical connector. The frame includes a locating feature for locating the electrical connector relative to the frame. The electrical connector assembly machine includes a pin support mechanism coupled to the frame. The pin support mechanism includes a first pin support fork and a second pin support fork. The first pin support fork includes a first connecting bar and a plurality of first tines extending from the first connecting bar. The first tines define first gaps between the first tines configured to receive connecting pins of the contacts. The second pin support fork includes a second connecting bar and a plurality of second tines extending from the second connecting bar. The second tines define second gaps between the second tines configured to receive the connecting pins of the contacts. The first pin support fork is stacked with the second pin support fork such that the first tines are configured to support the connecting pins at a first depth from ends of the connecting pins and the second tines are configured to support the connecting pins at a second depth from ends of the connecting pins greater than the first depth. The first and second tines cooperate to support the connecting pins for loading a pin organizer of the electrical connector onto ends of the connecting pins.

In a further embodiment, an electrical connector assembly machine for assembling an electrical connector having contacts held by a connector housing is provided. The electrical connector assembly machine includes a frame including a connector pocket configured to receive the electrical connector. The frame includes a locating feature for locating the electrical connector relative to the frame. The electrical connector assembly machine includes a pin support mechanism coupled to the frame. The pin support mechanism includes a first pin support fork and a second pin support fork. The first pin support fork includes a first connecting bar and a plurality of first tines extending from the first connecting bar. The first tines define first gaps between the first tines configured to receive connecting pins of the contacts. The second pin support fork includes a second connecting bar and a plurality of second tines extending from the second connecting bar. The second tines define second gaps between the second tines configured to receive the connecting pins of the contacts. The pin support mechanism includes a loading device coupled to the frame. The loading device supporting the first pin support fork and the second pin support fork. The loading device moving the first and second pin support forks in a loading direction from a retracted position to an advanced position. The first tines and the second tines are offset from the connector pocket in the retracted position. The first tines and the second tines are located in the connector pocket in the advanced position to engage and support the connecting pins for loading a pin organizer of the electrical connector onto ends of the connecting pins.

DETAILED DESCRIPTION OF THE INVENTION

Figure 1:
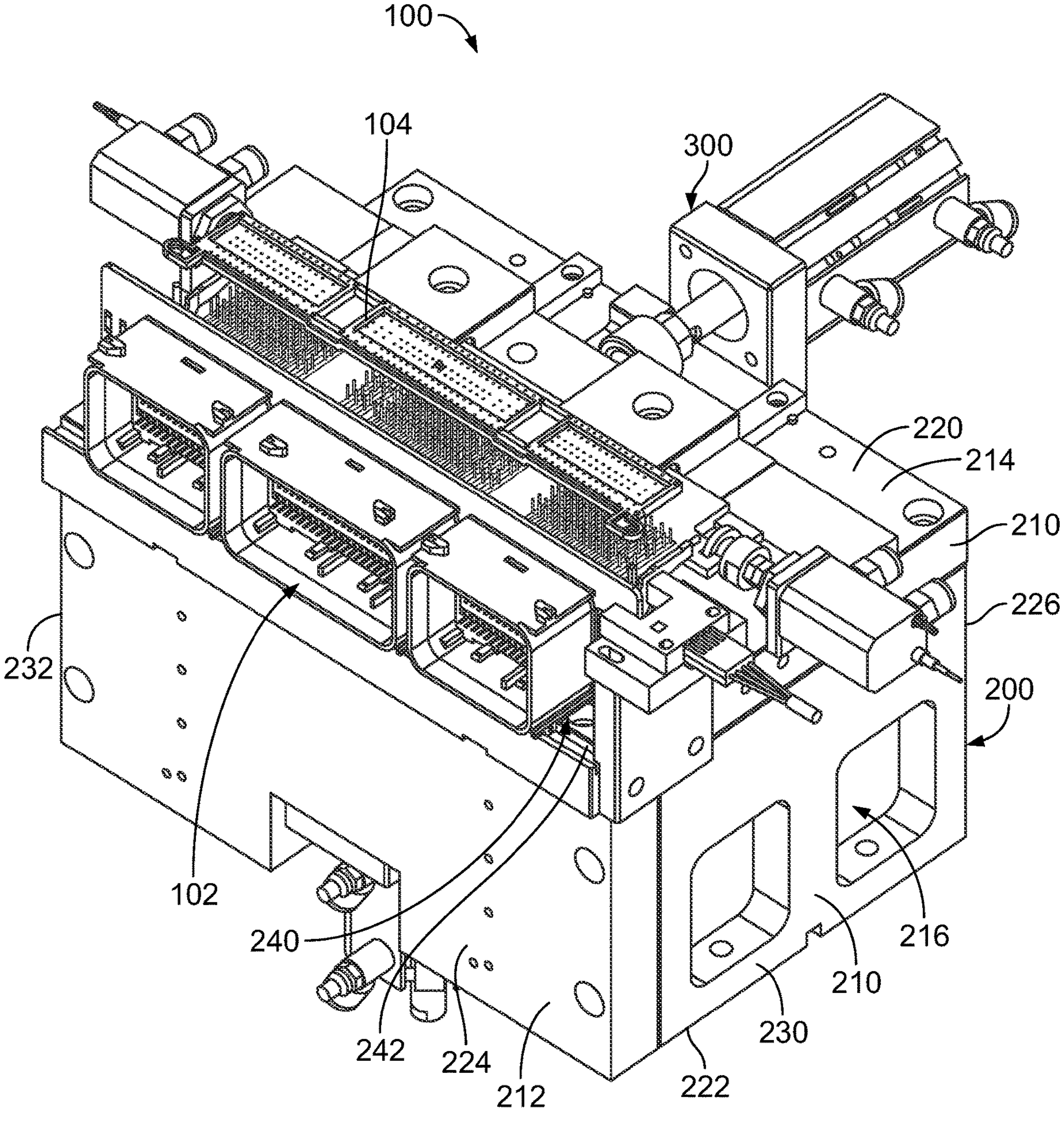
FIG. 1 is a perspective view of an electrical connector assembly machine in accordance with an exemplary embodiment.

FIG. 1 is a perspective view of an electrical connector assembly machine 100 in accordance with an exemplary embodiment. The electrical connector assembly machine 100 is used to assemble an electrical connector 102 during an automated assembly process. In an exemplary embodiment, the electrical connector assembly machine 100 is used for installing a pin organizer 104 (shown uncoupled from the electrical connector 102) on the electrical connector 102, particularly when the electrical connector 102 includes a large number of pins, such as in excess of 100 pins. In the illustrated embodiment, the electrical connector assembly machine 100 is used for installing the pin organizer 104 on the electrical connector 102 having in excess of 300 pins. The electrical connector assembly machine 100 holds each of the pins in position relative to each other for installing the pin organizer 104 onto the end of the electrical connector 102 without damaging (for example, bending) the pins.

The electrical connector assembly machine 100 includes a frame 200 and a pin support mechanism 300 coupled to the frame 200. The frame 200 is used to hold the electrical connector 102. The pin support mechanism 300 is used to hold the pins of the electrical connector for installation of the pin organizer 104. The frame 200 holds the components of the pin support mechanism 300 relative to the electrical connector 102.

The frame 200 includes a plurality of frame members 210, such as walls 212 and plates 214, which are assembled into the frame 200. The walls 212 and plates 214 may be secured together using fasteners, clips, latches, welding, and the like. The walls 212 and the plates 214 may form a cavity 216, such as to house components, such as electronics, motors, cables, wiring and the like. In the illustrated embodiment, the frame 200 is a generally box-shaped structure having a top 220, a bottom 222, a front 224, a rear 226 and opposite sides 230, 232. The frame 200 may have other shapes in alternative embodiments.

In an exemplary embodiment, the frame 200 includes a connector pocket 240 that receives the electrical connector 102. The connector pocket 240 may be provided at the top 220, such as near the front 224. However, other locations are possible in alternative embodiments. The frame 200 includes one or more locating features 242 for locating the electrical connector 102 relative to the frame 200. The locating features 242 include datum surfaces for positioning the electrical connector 102. The locating features 242 may be walls, surfaces, slots, grooves, posts, and the like. The electrical connector 102 is loaded into the connector pocket 240 and engages the locating features 242 to locate the electrical connector 102 within the connector pocket 240. The electrical connector 102 may be secured in the connector pocket 240 by one or more securing features (not shown), such as clamps, clips, latches, fasteners, and the like. The pin support mechanism 300 interfaces with the electrical connector 102 when the electrical connector 102 is positioned in the connector pocket 240, such as to hold the connector pins of the electrical connector 102 for assembly of the pin organizer 104 to the electrical connector 102.

Figure 2:
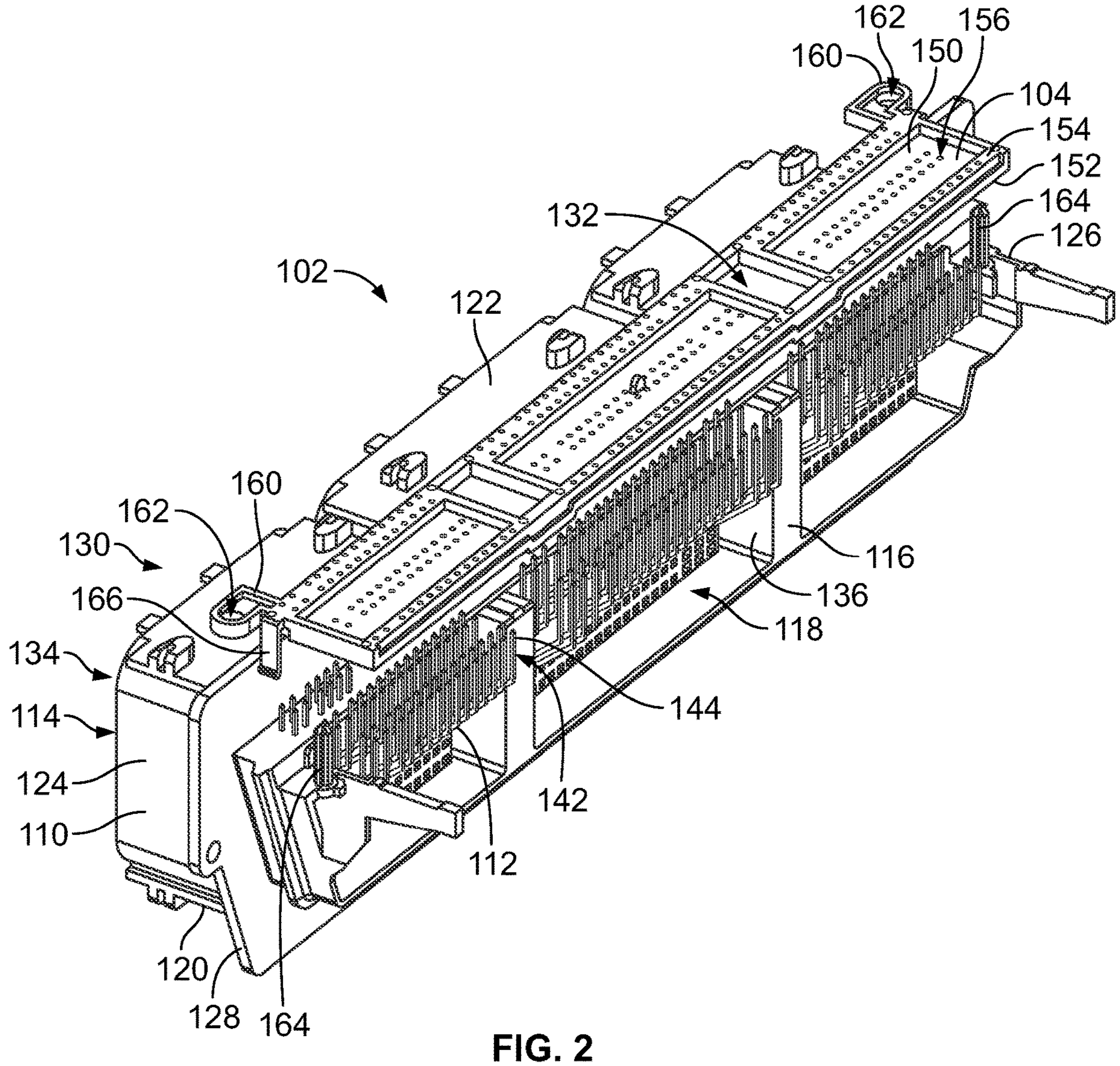
FIG. 2 is a bottom perspective view of the electrical connector in accordance with an exemplary embodiment.

FIG. 2 is a bottom perspective view of the electrical connector 102 in accordance with an exemplary embodiment. The electrical connector 102 includes a connector housing 110 holding a plurality of contacts 112. The connector housing 110 includes a front 114 and a rear 116. The connector housing 110 includes a contact cavity 118 between the front 114 and the rear 116 that receives the contacts 112. The connector housing 110 includes a top 120 and a bottom 122 opposite the top 120. The connector housing 110 includes a first side 124 and a second side 126 opposite the first side 124. In the illustrated embodiment, the connector housing 110 includes a flange 128, which may be used for securing the electrical connector 102 to another structure.

The electrical connector 102 includes a mating end 130 and a mounting end 132. The mounting end 132 is configured to be mounted to a substrate, such as a circuit board (not shown). The mating end 130 is configured to be mated with a mating electrical connector(s) (not shown). In the illustrated embodiment, the electrical connector 102 includes one or more receptacles 134 (also shown in FIG. 1) at the mating end 130, which are configured to receive one or more plugs of the mating connector(s). In the illustrated embodiment, the electrical connector 102 includes three receptacles 134 each having corresponding contact sets. The receptacles 134 are separated by separating walls 136, which divide the contact cavity 118 into different sections. In an exemplary embodiment, the electrical connector 102 is a right-angle electrical connector having the mating end 130 generally perpendicular to the mounting end 132. For example, the mating end 130 may be provided at the front 114 and the mounting end 132 may be provided at the bottom 122. Other orientations are possible in alternative embodiments. In other various embodiments, the electrical connector 102 may be a mezzanine connector having the mating end 130 and the mounting end 132 opposite each other, such as at the front 114 and the rear 116 or at the top 120 and the bottom 122.

The contacts 112 extend between the mating end 130 and the mounting end 132. In the illustrated embodiment, the contacts 112 are right angle contacts. The contacts 112 have mating ends 140 (shown in FIG. 1) at the mating end 130 and terminating ends 142 at the mounting end 132. The mating ends 140 are configured to be mated with the mating electrical connector(s). The terminating ends 142 are configured to be mounted to the substrate, such as the circuit board. In the illustrated embodiment, the mating ends 140 are mating pins. Other types of mating ends may be provided in alternative embodiments, such as spring beams, sockets, blades, and the like. In the illustrated embodiment, the terminating ends 142 include contact tails, such as connecting pins 144. The connecting pins 144 may be solder pins in various embodiments configured to be soldered to vias of a circuit board. In other various embodiments, the connecting pins 144 may be compliant pins, such as eye-of-the-needle pins. For example, the compliant pins may be press-fit into plated vias of the circuit board to electrically connect the contacts 112 with the circuit board.

The contacts 112 are arranged in an array. For example, at the mounting end 132, the terminating ends 142 are arranged in rows and columns (rows parallel to rear 116 and columns parallel to sides 124, 126). The array includes multiple rows and multiple columns. A large number of contacts 112 are provided in various embodiments. For example, in the illustrated embodiment, the array includes six (6) rows and fifty-one (51) columns for a total of three-hundred-six (306) contacts 112. The array may include greater or fewer rows and greater or fewer columns. In an exemplary embodiment, the electrical connector 102 has a high density of contacts, such as greater than one-hundred contacts 112. The connecting pins 144 have a predetermined row spacing and a predetermined column spacing corresponding to the pinout of the vias on the circuit board. The pin organizer 104 (shown uncoupled from the mounting end 132) is used to hold positions of the large number of connecting pins 144 relative to each other for termination to the circuit board. For example, the pin organizer 104 holds the connecting pins 144 at the appropriate row spacing and appropriate column spacing for loading into the vias of the circuit board without damaging (for example, bending) the connecting pins 144 as the connecting pins 144 are loaded into the vias. The electrical connector assembly machine 100 is used to hold the relative positions of the connecting pins 144 for assembly of the pin organizer 104 onto the ends of the connecting pins 144. For example, the electrical connector assembly machine 100 may hold the connecting pins 144 at the appropriate row spacing and appropriate column spacing for installing the pin organizer 104 onto the mounting end 132.

The pin organizer 104 is separate and discrete from the connector housing 110. The pin organizer 104 is configured to be coupled to the bottom 122 of the connector housing 110 to interface with the connecting pins 144. The pin organizer 104 is manufactured from a dielectric material, such as a plastic material to electrically isolate the contacts 112 from each other and prevent short circuiting. In various embodiments, the pin organizer 104 is a molded structure.

The pin organizer 104 includes a main body or plate 150 having an upper surface 152 and a lower surface 154. The upper surface 152 faces the bottom 122 of the connector housing 110. The lower surface 154 is configured to face the circuit board. The pin organizer 104 includes openings 156 extending through the plate 150. The openings 156 are configured to receive the connecting pins 144. The openings are arranged in a complimentary pattern as the pinout of the circuit board to orient the connecting pins 144 for terminating to the circuit board. For example, the openings 156 are arranged in rows and columns. The openings 156 have row spacings and column spacings that corresponding to the spacings of the vias of the circuit board. In various embodiments, the openings 156 may be enlarged at the upper surface 152, such as including a chamfered or funneled design to guide loading of the connecting pins 144 into the openings 156 as the pin organizer 104 is installed onto the mounting end 132 of the electrical connector 102.

In an exemplary embodiment, the pin organizer 104 includes a mounting bracket 160 having a mounting opening 162. The mounting opening 162 receives a guide post 164 extending from the bottom 122 of the connector housing 110 to locate the pin organizer 104 relative to the connector housing 110, and thus relative to the connecting pins 144. The pin organizer 104 may include other types of locating features to locate the pin organizer 104 to the connector housing 110. The pin organizer 104 includes a securing feature 166 for securing the pin organizer 104 to the connector housing 110. In the illustrated embodiment, the securing feature 166 is a latch; however, other types of securing features may be used in alternative embodiments.

Figure 3:
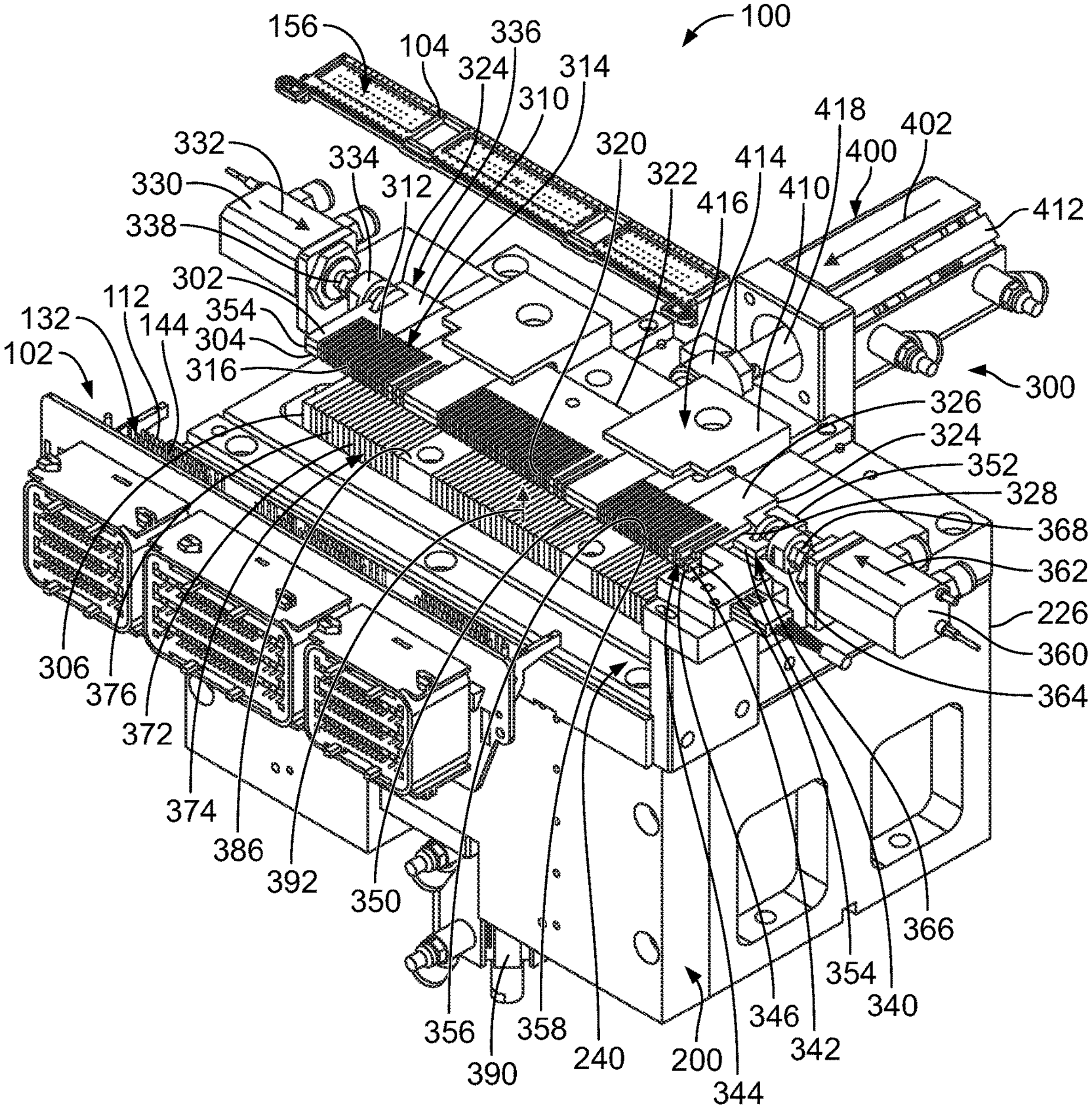
FIG. 3 is a front perspective view of the electrical connector assembly machine in accordance with an exemplary embodiment.

FIG. 3 is a front perspective view of the electrical connector assembly machine 100 in accordance with an exemplary embodiment. FIG. 3 illustrates the pin support mechanism 300 in accordance with an exemplary embodiment. The pin support mechanism 300 includes a plurality of combs or forks that are used to support the connecting pins 144 of the contacts 112 for installation of the pin organizer 104. The combs hold relative positions of the connecting pins 144 to prevent damage to the connecting pins 144 as the pin organizer 104 is installed over the ends of the connecting pins 144. For example, the combs align the connecting pins 144 with the openings 156 to load the ends of the connecting pins 144 into the openings 156 as the pin organizer 104 is loaded onto the mounting end 132 of the electrical connector 102. In an exemplary embodiment, the frame 200 receives the electrical connector 102 upside-down such that the connecting pins 144 extend upward to receive the pin organizer 104 from above. Other orientations are possible in alternative embodiments; however, the description herein is in relation to the electrical connector 102 being held upside-down.

The pin support mechanism 300 is coupled to the frame 200. The pin support mechanism 300 including an upper pin support fork 302, a lower pin support fork 304, and a base pin support fork 306. The pin support forks 302, 304, 306 cooperate to hold the connecting pins 144 straight (for example, vertically), parallel to each other, and in proper spacing (for example, maintaining row spacing and column spacing). In an exemplary embodiment, the pin support forks 302, 304, 306 are movable relative to the frame 200. The pin support forks 302, 304, 306 are movable relative to each other.

The upper pin support fork 302 may be comb-shaped in various embodiments. The upper pin support fork 302 includes an upper connecting bar 310 and a plurality of upper tines 312 extending from the upper connecting bar 310. The upper tines 312 define upper gaps 314 between the upper tines 312. The upper gaps 314 are configured to receive the connecting pins 144 of the contacts 112 such that the upper tines 312 extend between the connecting pins 144. For example, each upper gap 314 may receive a corresponding column of the connecting pins 144. The upper tines 312 are configured to be located between the corresponding columns of connecting pins 144.

The upper pin support fork 302 extends between a front 320 and a rear 322. The upper pin support fork 302 includes sides 324 extending between the front 320 and the rear 322 and extending between a top 326 and a bottom 328. In an exemplary embodiment, the top 326 and the bottom 328 are planar surfaces. The upper connecting bar 310 may be located at the rear 322 and extend between the sides 324. The upper tines 312 extend forwardly from the upper connecting bar 310 to tips 316 at distal ends of the upper tines 312. The upper tines 312 extend longitudinally along generally straight paths from the upper connecting bar 310 to the tips 316. The upper gaps 314 are open at the front 320 to receive the connecting pins 144. Optionally, the tips 316 may be chamfered to provide lead-in surfaces for the upper gaps 314. For example, the upper tines 312 may be narrower at the tips 316 such that the upper gaps 314 have wider mouths at the front 320 to guide loading of the connecting pins 144 into the upper gaps 314. In the illustrated embodiment, the upper tines 312 have tine widths that are approximately equal to gap widths of the upper gaps 314 between the tines 312. However, the tine widths may be greater than the gap widths or the gap widths may be greater than the tine widths in alternative embodiments.

In an exemplary embodiment, the pin support mechanism 300 includes an upper actuator 330 coupled to the upper pin support fork 302. The upper actuator 330 is operated to move the upper pin support fork 302 in an upper lateral direction 332. The upper lateral direction 332 is perpendicular to the longitudinal direction. For example, the upper lateral direction 332 may be side-to-side, such as in a horizontal direction. The upper pin support fork 302 is movable in the upper lateral direction 332 from a resting position to a shifted position. In the illustrated embodiment, the upper actuator 330 is positioned to one side 324 of the upper pin support fork 302. The upper actuator 330 includes a fitting 334 coupled to the upper pin support fork 302, such as to a mounting bracket 336 of the upper pin support fork 302. The mounting bracket 336 is located at the right side of the upper pin support fork 302 in the illustrated embodiment. Other positions and mounting locations are possible in alternative embodiments. A piston 338 of the actuator 330 is coupled to the fitting 334. The piston 338 is driven in the lateral direction 332 to move the upper pin support fork 302. The upper actuator 330 may be a pneumatic actuator or a hydraulic actuator having a piston that is driven by air or fluid. The upper actuator 330 may use springs or other biasing mechanisms to control movements of the upper pin support fork 302. In alternative embodiments, the upper actuator 330 may be an electric actuator including an electric motor and a drive shaft rotatable to move the upper pin support fork 302 based in direction of rotation and number of revolutions.

The lower pin support fork 304 may be comb-shaped in various embodiments. In an exemplary embodiment, the lower pin support fork 304 is similar to the upper pin support fork 302. For example, the lower pin support fork 304 may be identical to the upper pin support fork 302 and may be inverted 180°. In an exemplary embodiment, the upper and lower pin support forks 302, 304 are stacked end to end in a fork stack (for example, with the lower pin support fork 304 positioned below the upper pin support fork 302). The upper and lower pin support forks 302, 304 may be movable relative to each other, such as being slidable in different lateral directions to interface with the connecting pins 144.

The lower pin support fork 304 includes a lower connecting bar 340 and a plurality of lower tines 342 extending from the lower connecting bar 340. The lower tines 342 define lower gaps 344 between the lower tines 342. The lower gaps 344 are configured to receive the connecting pins 144 of the contacts 112 such that the lower tines 342 extend between the connecting pins 144. For example, each lower gap 344 may receive a corresponding column of the connecting pins 144. The lower tines 342 are configured to be located between the corresponding columns of connecting pins 144.

The lower pin support fork 304 extends between a front 350 and a rear 352. The lower pin support fork 304 includes sides 354 extending between the front 350 and the rear 352 and extending between a top 356 and a bottom 358. In an exemplary embodiment, the top 356 and the bottom 358 are planar surfaces. The top 356 of the lower pin support fork 304 faces, and may abut against, the bottom 328 of the upper pin support fork 302. The lower connecting bar 340 may be located at the rear 352 and extend between the sides 354. The lower tines 342 extend forwardly from the lower connecting bar 340 to tips 346 at distal ends of the lower tines 342. The lower tines 342 extend longitudinally along generally straight paths from the lower connecting bar 340 to the tips 346. The lower tines 342 may be generally aligned with the upper tines 312 and the lower gaps 344 may be generally aligned with the upper gaps 314. The lower gaps 344 are open at the front 350 to receive the connecting pins 144. Optionally, the tips 346 may be chamfered to provide lead-in surfaces for the lower gaps 344. For example, the lower tines 342 may be narrower at the tips 346 such that the lower gaps 344 have wider mouths at the front 350 to guide loading of the connecting pins 144 into the lower gaps 344. In the illustrated embodiment, the lower tines 342 have tine widths that are approximately equal to gap widths of the lower gaps 344 between the tines 342. However, the tine widths may be greater than the gap widths or the gap widths may be greater than the tine widths in alternative embodiments.

In an exemplary embodiment, the pin support mechanism 300 includes a lower actuator 360 coupled to the lower pin support fork 304. The lower actuator 360 is operated to move the lower pin support fork 304 in a lower lateral direction 362. The lower lateral direction 362 is perpendicular to the longitudinal direction. For example, the lower lateral direction 362 may be side-to-side, such as in a horizontal direction. In an exemplary embodiment, the lower lateral direction 362 is opposite the upper lateral direction 332. For example, the lower lateral direction 362 is right-to-left and the upper lateral direction 332 is left-to-right, or vice versa. The lower pin support fork 304 is movable in the lower lateral direction 362 from a resting position to a shifted position. In the illustrated embodiment, the lower actuator 360 is positioned to one side 354 of the lower pin support fork 304. The lower actuator 360 includes a fitting 364 coupled to the lower pin support fork 304, such as to a mounting bracket 366 of the lower pin support fork 304. The mounting bracket 366 is located at the left side of the lower pin support fork 304 in the illustrated embodiment. Other positions and mounting locations are possible in alternative embodiments. A piston 368 of the actuator 360 is coupled to the fitting 364. The piston 368 is driven in the lateral direction 362 to move the lower pin support fork 304. The lower actuator 360 may be a pneumatic actuator or a hydraulic actuator having a piston that is driven by air or fluid. The lower actuator 360 may use springs or other biasing mechanisms to control movements of the lower pin support fork 304. In alternative embodiments, the lower actuator 360 may be an electric actuator including an electric motor and a drive shaft rotatable to move the lower pin support fork 304 based in direction of rotation and number of revolutions.

The base pin support fork 306 may be comb-shaped in various embodiments. In an exemplary embodiment, the base pin support fork 306 is similar to the upper pin support fork 302 and/or the lower pin support fork 304. Optionally, the base pin support fork 306 may be thicker than the upper pin support fork 302 and/or the lower pin support fork 304. In an exemplary embodiment, the base pin support fork 306 may be stacked with the upper and lower pin support forks 302, 304 in the fork stack. Optionally, the base pin support fork 306 may be spaced apart from the upper and lower pin support forks 302, 304 in the fork stack, such as with a space or gap therebetween. The base pin support fork 306 may be movable relative to the upper and lower pin support forks 302, 304 from a home or retracted position to an advanced or mated position. For example, the base pin support fork 306 is movable generally toward the upper and lower pin support forks 302, 304 when moved from the home position to the mated position.

The base pin support fork 306 includes a base connecting bar (not shown) and a plurality of base tines 372 extending from the base connecting bar. The base tines 372 define base gaps 374 between the base tines 372. The base gaps 374 are configured to receive the connecting pins 144 of the contacts 112 such that the base tines 372 extend between the connecting pins 144. For example, each base gap 374 may receive a corresponding column of the connecting pins 144. The base tines 372 are configured to be located between the corresponding columns of connecting pins 144.

The base pin support fork 306 extends between a front 380 and a rear (not shown) opposite the front. The base pin support fork 306 includes opposite sides 384. The base pin support fork 306 extends between a top 386 and a bottom (not shown). In an exemplary embodiment, the top 386 is a planar surface. The top 386 of the base pin support fork 306 faces the bottom 358 of the lower pin support fork 304. The base tines 372 extend forwardly from the base connecting bar to tips 376 at distal ends of the base tines 372. The base tines 372 extend longitudinally along generally straight paths from the base connecting bar to the tips 376. The base tines 372 may be generally aligned with the upper and lower tines 312, 342 and the base gaps 374 may be generally aligned with the upper and lower gaps 314, 344. The base gaps 374 are open at the front 380 to receive the connecting pins 144. Optionally, the tips 376 may be chamfered to provide lead-in surfaces for the base gaps 374. For example, the base tines 372 may be narrower at the tips 376 such that the base gaps 374 have wider mouths at the front 380 to guide loading of the connecting pins 144 into the base gaps 374. Optionally, the base tines 372, along the top 386, may be chamfered to provide lead-in surfaces for the base gaps 374. In the illustrated embodiment, the base tines 372 have tine widths that are approximately equal to gap widths of the base gaps 374 between the tines 372. However, the tine widths may be greater than the gap widths or the gap widths may be greater than the tine widths in alternative embodiments. Optionally, the base tines 372 may be narrower at the top 386 such that the base gaps 374 are wider at the top 386 than along other portions of the base tines 372.

In an exemplary embodiment, the pin support mechanism 300 includes a base actuator 390 coupled to the base pin support fork 306. The base actuator 390 is operated to move the base pin support fork 306 in a mating direction 392. The base pin support fork 306 is moved in the mating direction 392 to mate the base tines 372 with the connecting pins 144. The mating direction 392 is perpendicular to the longitudinal direction. For example, the mating direction 392 may be in a vertical direction. The base pin support fork 306 is movable in the mating direction 392 from a resting position to a shifted position. The base pin support fork 306 is moved upward from the resting position to the shifted position. In the illustrated embodiment, the base actuator 390 is positioned below the base pin support fork 306. Other positions are possible in alternative embodiments. The base actuator 390 may be a pneumatic actuator or a hydraulic actuator having a piston that is driven by air or fluid. The base actuator 390 may use springs or other biasing mechanisms to control movements of the base pin support fork 306. In alternative embodiments, the base actuator 390 may be an electric actuator including an electric motor and a drive shaft rotatable to move the base pin support fork 306 based in direction of rotation and number of revolutions.

In an exemplary embodiment, the pin support mechanism 300 includes a loading device 400 coupled to the frame 200. The loading device 400 moves the components of the pin support mechanism 300 in a loading direction 402, such as in a forward loading direction. The loading device 400 supporting the upper pin support fork 302, the lower pin support fork 304, and the base pin support fork 304. The loading device 400 moves the upper pin support fork 302, the lower pin support fork 304, and the base pin support fork 304 relative to the electrical connector 102, such as to load the pin support forks 302, 304, 306 onto the connecting pins 144. The loading device 400 is movable from a retracted position to an advanced position. The pin support forks 302, 304, 306 are offset from the electrical connector 102 in the retracted position. The pin support forks 302, 304, 306 are aligned with and internested with the connecting pins 144 of the electrical connector 102 in the advanced position. For example, the upper tines 312, the lower tines 342, and the base tines 372 are offset from (for example, outside of) the connector pocket 240 in the retracted position, and thus do not interface with the electrical connector 102. The loading device 400 moves the pin support forks 302, 304, 306 forward in the loading direction 402 to the advanced position to locate the upper tines 312, the lower tines 342, and the base tines 372 in the connector pocket 240. The upper tines 312, the lower tines 342, and the base tines 372 are configured to engage and support the connecting pins 144 in the advanced position. The gaps 314, 344, 374 are open at the front to receive the connecting pins 144 as the pin support forks 302, 304, 306 are moved forward in the advancing or loading direction 402.

The loading device 400 includes a slide 410 coupled to the frame 200. The loading device 400 includes a loading actuator 412 coupled to the slide 410 to move the slide 410 relative to the frame 200. The slide 410 is movable along a horizontal plane. The pin support forks 302, 304, 306 are movable in the loading direction 402 with the slide 410. The slide 410 is moved after the electrical connector 102 is positioned in the frame 200 to load the tines 312, 342, 372 between the connecting pins 144. In the illustrated embodiment, the loading actuator 412 is positioned at the rear 226 of the frame 200. The loading actuator 412 includes a fitting 414 coupled to the slide 410, such as to a mounting bracket 416 of the slide 410. A piston 418 of the loading actuator 412 is coupled to the fitting 414. The piston 368 is driven in the loading direction 402 to move the slide 410 and the associated components. The loading actuator 412 may be a pneumatic actuator or a hydraulic actuator having a piston that is driven by air or fluid. The loading actuator 412 may use springs or other biasing mechanisms to control movements of the slide 410. In alternative embodiments, the loading actuator 412 may be an electric actuator including an electric motor and a drive shaft rotatable to move the slide 410 based in direction of rotation and number of revolutions.

In operation, the pin support forks 302, 304, 306 are originally positioned in home positions. For example, the loading device 400 is in the retracted position. The upper and lower pin support forks 302, 304 are at the resting positions. The base pin support fork 306 is at the retracted position. The pin support forks 302, 304, 306 are outside of the connector pocket 240 in the retracted or home positions to allow the electrical connector 102 to be loaded, unobstructed, into the connector pocket 240. After the electrical connector 102 is positioned in the connector pocket 240, the pin support forks 302, 304, 306 may be moved into supporting positions. The loading device 400 slides the pin support forks 302, 304, 306 forward into the connector pocket 240. Once positioned, the upper pin support fork 302 is shifted in the upper lateral direction 332 to interface with the connecting pins 144; the lower pin support fork 304 is shifted in the lower lateral direction 362 to interface with the connecting pins 144; and the base pin support fork 306 is shifted in the mating direction 392 to interface with the connecting pins 144.

When activated, the upper pin support fork 302 is shifted in the upper lateral direction 332 to load the upper tines 312 against the connecting pins 144. The lower pin support fork 304 is shifted in the lower lateral direction 362 opposite the upper lateral direction 332 to load the lower tines 342 against the connecting pins 144. The base pin support fork 306 is shifted upward in the mating direction 392 to load the base tines 372 against the connecting pins 144. The upper tines 312 and the lower tines 342 cooperate to hold the connecting pins 144 relative to each other for loading the pin organizer 104 onto the ends of the connecting pins 144. For example, the upper and lower pin support forks 302, 304 cooperate to fix lateral positions of each of the connecting pins 144 to resist lateral movement of the connecting pins 144 in either the upper lateral direction 332 or the opposite lower lateral direction 362. Each connecting pin 144 is pinched between the corresponding upper tine 312 and the corresponding lower tine 342.

The pin support forks 302, 304, 306 are stacked together in the fork stack, such as with the upper pin support fork 302 above the lower pin support fork 304 and the lower pin support fork 304 above the base pin support fork 306. The upper tines 312 are configured to support the connecting pins 144 at a first depth from the ends of the connecting pins 144, the lower tines 342 are configured to support the connecting pins 144 at a second depth from the ends of the connecting pins 144 greater than the first depth, and the base tines 372 are configured to support the connecting pins 144 at a third depth from the ends of the connecting pins 144 greater than the second depth. The pin support forks 302, 304, 306 support each of the connecting pins 144 at three different depths to provide stability and support for the connecting pins 144. The pin support forks 302, 304, 306 hold the connecting pins 144 straight (for example, vertically), parallel to each other, and in proper spacing.

Figure 4:
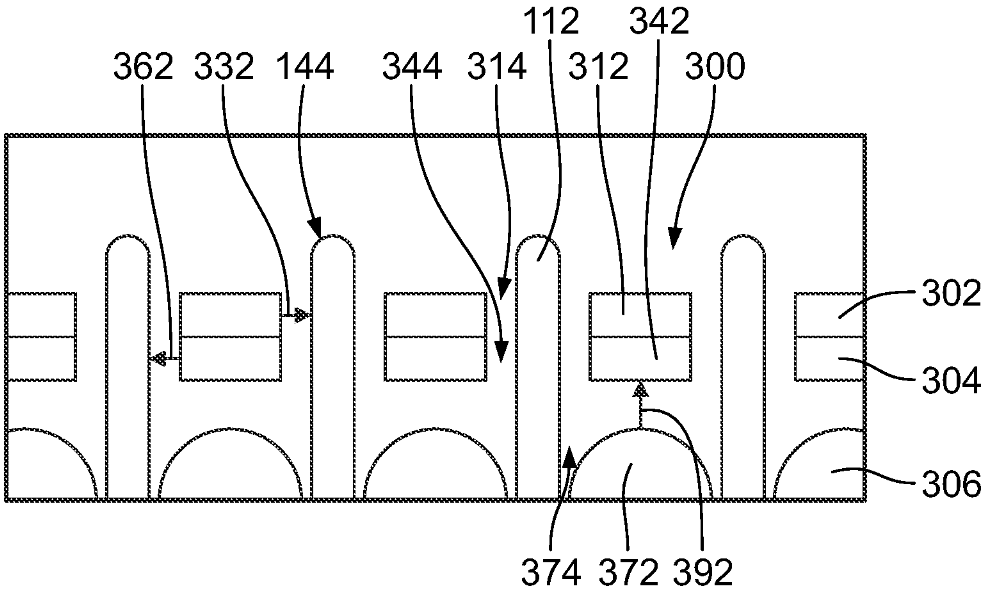
FIG. 4 is an end view of a portion of the pin support mechanism in accordance with an exemplary embodiment showing the pin support mechanism in the loaded position, prior to advancing the pin support forks to the respective advanced or mated positions.
Figure 5:
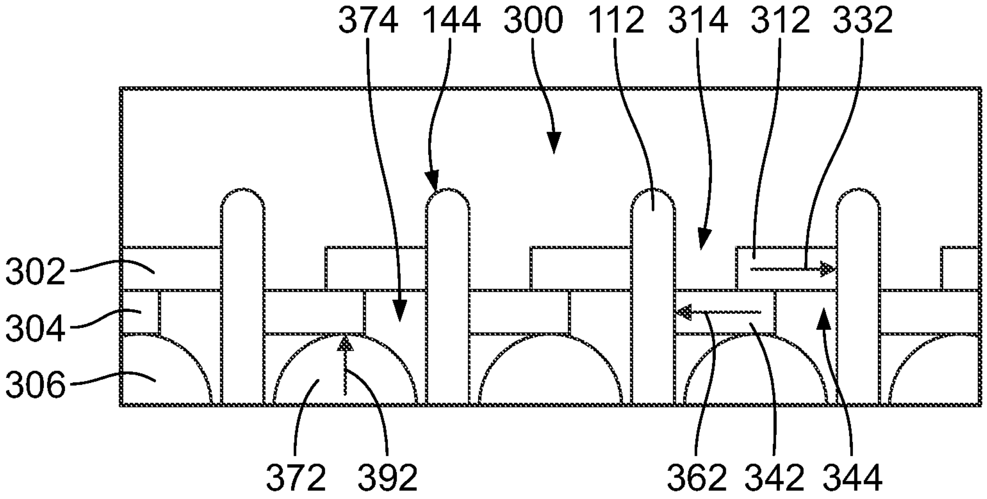
FIG. 5 is an end view of a portion of the pin support mechanism in accordance with an exemplary embodiment showing the pin support forks in the respective advanced or mated positions.

FIG. 4 is an end view of a portion of the pin support mechanism 300 in accordance with an exemplary embodiment showing the pin support mechanism 300 in the loaded position, prior to advancing the pin support forks 302, 304, 306 to the respective advanced or mated positions. FIG. 5 is an end view of a portion of the pin support mechanism 300 in accordance with an exemplary embodiment showing the pin support forks 302, 304, 306 in the respective advanced or mated positions.

When loaded, the connecting pins 144 are received in the gaps 314, 344, 374 between the tines 312, 342, 372. The gaps 314, 344, 374 are oversized relative to the connecting pins 144. For example, the gap widths are wider than the connecting pins 144. As such, the pin support forks 302, 304, 306 are configured to be loaded into position relative to the connecting pins 144 (for example, moved in the loading direction by the loading device 400 (shown in FIG. 3) easily and without interference or damage to the connecting pins 144. Once positioned, the pin support forks 302, 304, 306 are actuated into supporting positions (FIG. 5). The upper pin support fork 302 is shifted in the upper lateral direction 332 to load the upper tines 312 against the connecting pins 144; the lower pin support fork 304 is shifted in the lower lateral direction 362 opposite the upper lateral direction 332 to load the lower tines 342 against the connecting pins 144; and the base pin support fork 306 is shifted upward in the mating direction 392 to load the base tines 372 against the connecting pins 144. The connecting pins 144 are pinched between the corresponding upper tine 312 and the corresponding lower tine 342 to fix lateral positions of each of the connecting pins 144 to resist lateral movement of the connecting pins 144 side-to-side. The pin support forks 302, 304, 306 support each of the connecting pins 144 at the three different depths to provide stability and support for the connecting pins 144. For example, the base tines 372 support the connecting pins 144 at bases of the contacts 112, such as closer to the area where the contacts 112 exit the housing (for example, remote from the ends of the contacts 112), while the upper and lower tines 312, 342 support the connecting pins 144 closer to the ends of the connecting pins 144.

Figure 6:
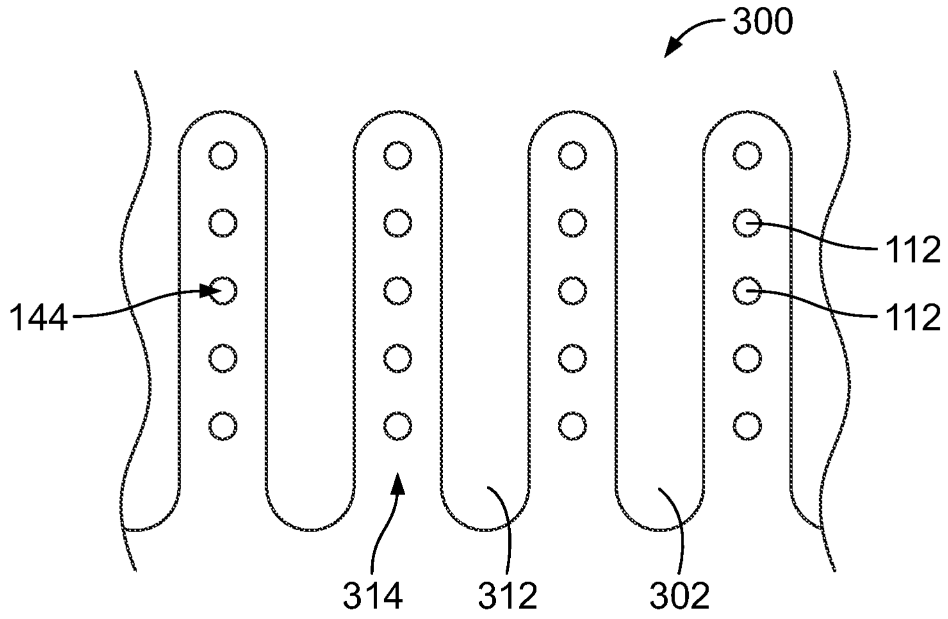
FIG. 6 is a top view of a portion of the pin support mechanism in accordance with an exemplary embodiment showing the pin support mechanism in the loaded position, prior to advancing the pin support forks to the respective advanced or mated positions.
Figure 7:
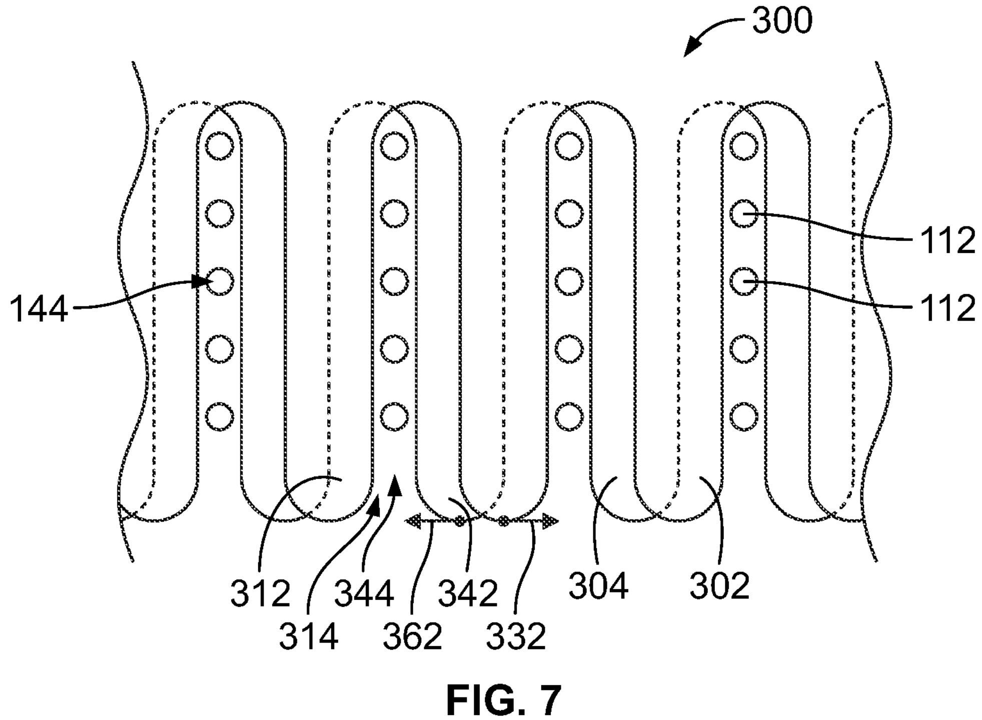
FIG. 7 is a top view of a portion of the pin support mechanism in accordance with an exemplary embodiment showing the pin support forks in the respective advanced or mated positions.

FIG. 6 is a top view of a portion of the pin support mechanism 300 in accordance with an exemplary embodiment showing the pin support mechanism 300 in the loaded position, prior to advancing the pin support forks 302, 304 to the respective advanced or mated positions. FIG. 7 is a top view of a portion of the pin support mechanism 300 in accordance with an exemplary embodiment showing the pin support forks 302, 304 in the respective advanced or mated positions.

When loaded, the connecting pins 144 are received in the gaps 314, 344 between the tines 312, 342. The gaps 314, 344 are oversized relative to the connecting pins 144. For example, the gap widths are wider than the connecting pins 144. As such, the pin support forks 302, 304, 306 are configured to be loaded into position relative to the connecting pins 144 (for example, moved in the loading direction by the loading device 400 (shown in FIG. 3) easily and without interference or damage to the connecting pins 144.

Once positioned, the pin support forks 302, 304, 306 are actuated into supporting positions (FIG. 7). The upper pin support fork 302 is shifted in the upper lateral direction 332 to load the upper tines 312 against the connecting pins 144 and the lower pin support fork 304 is shifted in the lower lateral direction 362 opposite the upper lateral direction 332 to load the lower tines 342 against the connecting pins 144. The connecting pins 144 are pinched between the corresponding upper tine 312 and the corresponding lower tine 342 to fix lateral positions of each of the connecting pins 144 to resist lateral movement of the connecting pins 144 side-to-side. The pin support forks 302, 304 hold the connecting pins 144 straight (for example, vertically), parallel to each other, and in proper spacing.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector assembly machine for assembling an electrical connector having contacts held by a connector housing, the electrical connector assembly machine comprising:

a frame including a connector pocket configured to receive the electrical connector, the frame including a locating feature for locating the electrical connector relative to the frame; and a pin support mechanism coupled to the frame, the pin support mechanism including a first pin support fork and a second pin support fork, the first pin support fork including a first connecting bar and a plurality of first tines extending from the first connecting bar, the first tines defining first gaps between the first tines configured to receive connecting pins of the contacts, the second pin support fork including a second connecting bar and a plurality of second tines extending from the second connecting bar, the second tines defining second gaps between the second tines configured to receive the connecting pins of the contacts, the second tines extending parallel to the first tines, wherein the first pin support fork is configured to be shifted in a first lateral direction to load the first tines against the connecting pins and the second pin support fork is configured to be shifted in a second lateral direction parallel to and opposite the first lateral direction to load the second tines against the connecting pins, wherein the first tines and the second tines cooperate to hold the connecting pins relative to each other for loading a pin organizer of the electrical connector onto ends of the connecting pins.

2. The electrical connector assembly machine of claim 1, wherein the first and second pin support forks are configured to cooperate to fix lateral positions of each of the connecting pins to resist lateral movement of the connecting pins in either the first lateral direction or the opposite second lateral direction.

3. The electrical connector assembly machine of claim 1, wherein the first pin support fork is stacked with the second pin support fork such that the first tines are configured to support the connecting pins at a first depth from ends of the connecting pins and the second tines are configured to support the connecting pins at a second depth from ends of the connecting pins greater than the first depth.

4. The electrical connector assembly machine of claim 3, wherein the first and second pin support forks are configured to cooperate to fix lateral positions of each of the connecting pins to resist lateral movement of the connecting pins in either the first lateral direction or the opposite second lateral direction.

5. The electrical connector assembly machine of claim 3, wherein the first pin support fork is an upper pin support fork and the second pin support fork is a lower pin support fork, the upper pin support fork being shifted in a first lateral direction to load the first tines against the connecting pins and the second pin support fork is shifted in a second lateral direction opposite the first lateral direction to load the second tines against the connecting pins to hold the connecting pins relative to each other.

6. The electrical connector assembly machine of claim 3, further comprising a base pin support fork separate from the first and second pin support forks, the base pin support fork including a base connecting bar and a plurality of base tines extending from the base connecting bar, the base tines defining base gaps between the base tines configured to receive the connecting pins of the contacts, the base tines configured to support each of the connecting pins independent of the first and second tines such that the connecting pins are supported by the base tines, the first tines and the second tines.

7. The electrical connector assembly machine of claim 6, wherein the base pin support fork is movable in a mating direction relative to the first and second pin support forks, the mating direction being generally toward the first and second lateral directions, the base tines configured to engage the connecting pins when moved in the mating direction.

8. The electrical connector assembly machine of claim 3, wherein the pin support mechanism includes a loading device coupled to the frame, the loading device supporting the first pin support fork and the second pin support fork, the loading device movable from a retracted position to an advanced position, the first tines and the second tines being offset from the connector pocket in the retracted position, the first tines and the second tines being located in the connector pocket in the advanced position to engage and support the connecting pins, the first and second tines being configured to move to supporting positions between the connecting pins such that the first and second gaps receive the connecting pins when the loading device moves the first and second pin support forks from the retracted position to the advanced position.

9. The electrical connector assembly machine of claim 1, wherein the first tines extend along longitudinal axes from the first connecting bar to first tips and the second tines extend along longitudinal axes from the second connecting bar to second tips, the first lateral direction being generally perpendicular to the longitudinal axes of the first tines, the second lateral direction being generally perpendicular to the longitudinal axes of the second tines.

10. The electrical connector assembly machine of claim 1, wherein each connecting pin is pinched between the corresponding first tine and the corresponding second tine.

11. The electrical connector assembly machine of claim 1, wherein the first pin support fork is movable in the first lateral direction from a first resting position to a first shifted position and the second pin support fork is movable in the second lateral direction from a second resting position to a second shifted position, the first tines being aligned with the second tines in the first and second resting positions, the first tines being offset from the second tines in the first and second shifted positions.

12. The electrical connector assembly machine of claim 1, wherein the first pin support fork is coupled to a first actuator and the second pin support fork is coupled to a second actuator, the first actuator being operated to move the first pin support fork in the first lateral direction, the second actuator being actuated to move the second pin support fork in the second lateral direction.

13. The electrical connector assembly machine of claim 1, further comprising a base pin support fork separate from the first and second pin support forks, the base pin support fork including a base connecting bar and a plurality of base tines extending from the base connecting bar, the base tines defining base gaps between the base tines configured to receive the connecting pins of the contacts, the base tines configured to support each of the connecting pins independent of the first and second tines such that the connecting pins are supported by the base tines, the first tines and the second tines.

14. The electrical connector assembly machine of claim 13, wherein the base pin support fork is movable relative to the first and second pin support forks in a mating direction perpendicular to the first and second lateral directions.

15. The electrical connector assembly machine of claim 1, wherein the pin support mechanism includes a loading device coupled to the frame, the loading device supporting the first pin support fork and the second pin support fork, the loading device movable from a retracted position to an advanced position, the first tines and the second tines being offset from the connector pocket in the retracted position, the first tines and the second tines being located in the connector pocket in the advanced position to engage and support the connecting pins.

16. The electrical connector assembly machine of claim 15, wherein the first and second tines are configured to move to supporting positions between the connecting pins such that the first and second gaps receive the connecting pins when the loading device moves the first and second pin support forks from the retracted position to the advanced position.

17. The electrical connector assembly machine of claim 15, wherein the first pin support fork is coupled to a first actuator moving the first pin support fork in a first lateral direction to load the first tines against the connecting pins and wherein the second pin support fork is coupled to a second actuator moving the second pin support fork in a second lateral direction opposite the first lateral direction to load the second tines against the connecting pins, wherein the first and second lateral directions are perpendicular to the loading direction.

18. The electrical connector assembly machine of claim 15, further comprising a base pin support fork separate from the first and second pin support forks, the base pin support fork including a base connecting bar and a plurality of base tines extending from the base connecting bar, the base tines defining base gaps between the base tines configured to receive the connecting pins of the contacts, the loading device moving the base pin support fork in the loading direction to align the base tines with the connecting pins, the base pin support fork coupled to a base actuator moving the base pin support fork in a mating direction perpendicular to the loading direction and perpendicular to the first and second lateral directions, the base tines configured to support each of the connecting pins independent of the first and second tines when mated with the connecting pins.

* * * * *